INVENTOR.
WALTER FERRIS

Sept. 2, 1952 W. FERRIS 2,608,933
HYDRODYNAMIC MACHINE
Filed Sept. 24, 1945 6 Sheets-Sheet 2

INVENTOR.
WALTER FERRIS
BY
*Keeley P. Merrill*
ATTORNEY

Sept. 2, 1952  W. FERRIS  2,608,933
HYDRODYNAMIC MACHINE
Filed Sept. 24, 1945  6 Sheets-Sheet 3

INVENTOR.
WALTER FERRIS
BY
Wesley P. Merrill
ATTORNEY

Sept. 2, 1952 — W. FERRIS — 2,608,933
HYDRODYNAMIC MACHINE
Filed Sept. 24, 1945 — 6 Sheets-Sheet 4
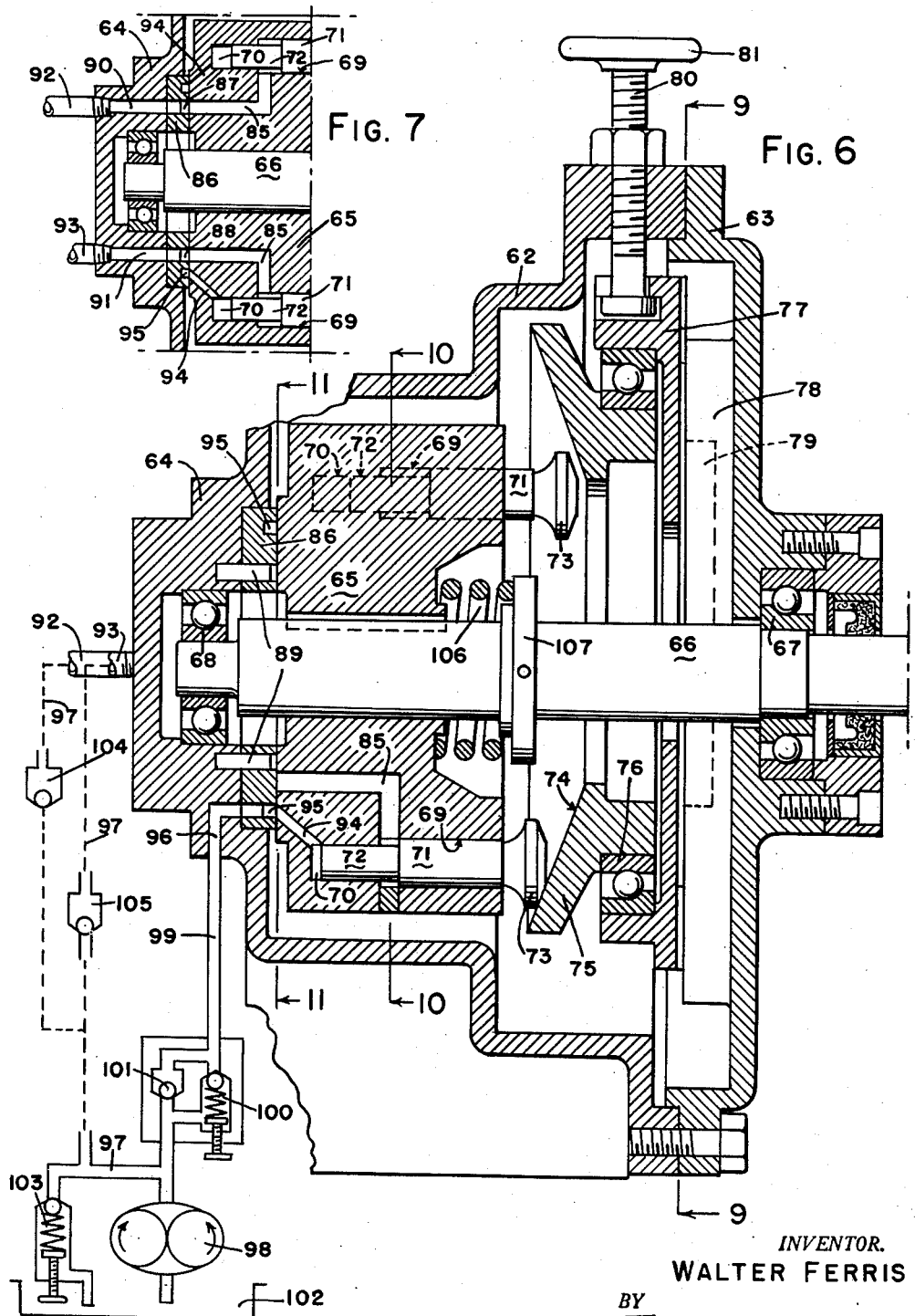
INVENTOR.
WALTER FERRIS
BY
ATTORNEY Sept. 2, 1952 W. FERRIS 2,608,933
HYDRODYNAMIC MACHINE
Filed Sept. 24, 1945 6 Sheets-Sheet 5
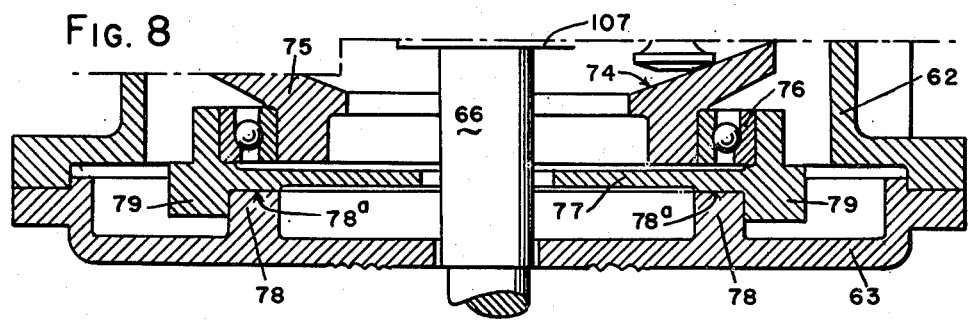
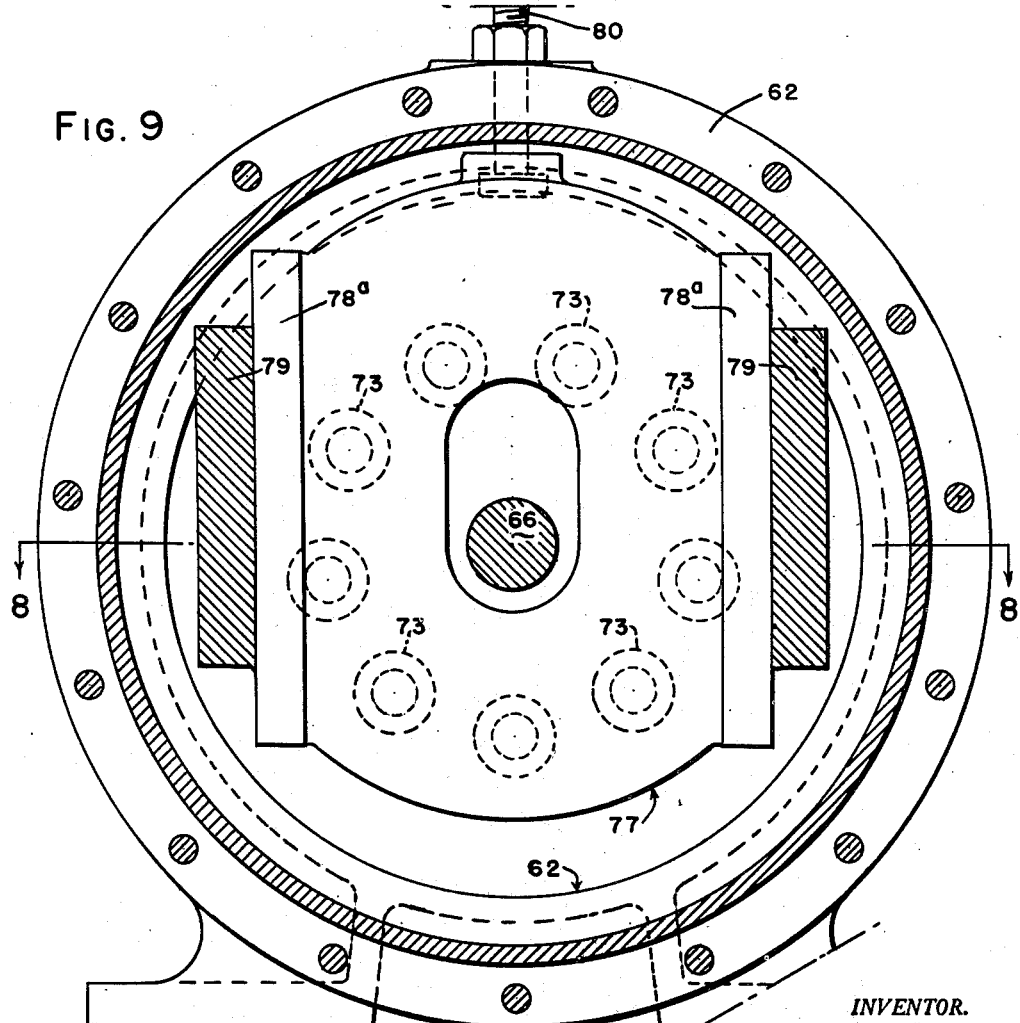
INVENTOR.
WALTER FERRIS
BY
ATTORNEY Sept. 2, 1952 W. FERRIS 2,608,933
HYDRODYNAMIC MACHINE Filed Sept. 24, 1945 6 Sheets-Sheet 6

INVENTOR.
WALTER FERRIS
BY
ATTORNEY

Patented Sept. 2, 1952

2,608,933

UNITED STATES PATENT OFFICE 2,608,933

HYDRODYNAMIC MACHINE

Walter Ferris, Milwaukee, Wis., assignor to The Oilgear Company, Milwaukee, Wis., a corporation of Wisconsin Application September 24, 1945, Serial No. 618,288

15 Claims. (Cl. 103—161)

This invention relates to hydrodynamic machines of the type having cylinders arranged in a rotatable cylinder barrel, pistons fitted in the cylinders with their outer ends in engagement with a thrust member which is eccentric to the cylinder barrel and causes the pistons to reciprocate in their cylinders during rotation of the cylinder barrel, and a valve for controlling the flow of liquid to and from the cylinders.

More particularly, the invention relates to a hydrodynamic machine of the rolling piston type. That is, a machine having an annular reaction surface arranged upon its thrust member and engaging the outer end of each piston upon a single spot which is offset far enough from the piston axis to cause the piston to rotate in its cylinder as it reciprocates therein, such as the hydrodynamic machine described and claimed in Patent No. 2,074,068.

In the machine shown in the above patent, the cylinder barrel rotates upon a shaft or pintle which constitutes the valve for controlling the flow of liquid to and from the cylinders but machines of the rolling piston type are also made with flat valves on one or both ends of the cylinder barrel to control the flow of liquid to and from the cylinders, such as the machine shown in Patent No. 2,273,468, and the present invention is particularly applicable to a rolling piston machine of the flat valve type.

A machine of the rolling piston type will function as a pump when it is driven mechanically and it will function as a hydraulic motor when it is supplied with liquid under pressure. Since the function of a pump and the function of a motor are substantially opposite to each other, machines embodying the invention will be explained and referred to herein as pumps but it is to be understood that the invention is equally applicable to a motor and is in no way limited to a pump.

When a rolling piston pump is in operation, each piston moves outward and its cylinder is supplied with liquid during one half of each revolution of the cylinder barrel, and the thrust member forces the piston inward and causes it to expel liquid from its cylinder during the other half of each revolution of the cylinder barrel.

Due to the reaction surface engaging each piston upon a single spot, the pumping force transmitted through the piston is limited by the bearing value of that spot. If the pump is designed to create pressures below a moderate value such as 1200 lbs. per sq. in., each piston may be headless and of such diameter that the contact spot may be located far enough from the piston axis to cause the piston to rotate as it reciprocates. If the pump is designed to create pressures up to a high value such as 3500 lbs. per sq. in., the pistons must be reduced in diameter accordingly in order to keep the maximum pumping force within the bearing value of the contact spot and each piston must be provided with an enlarged head, as shown in Patent No. 2,074,068, in order that the contact spot may be located far enough from the piston axis to cause the piston to rotate as it reciprocates.

Rolling pistons with large heads operate successfully in pumps designed to create pressures up to the maximum ordinarily required but in a pump designed to create very high pressures, such as 6000 lbs. per sq. in., each piston would necessarily be so small in diameter that the distance between its axis and the contact spot would be so great relative to the radius of the piston that there would be grave danger of the head breaking off when the pump was required to create a very high pressure.

The present invention has as an object to provide a rolling piston pump which can create high pressures without danger of breaking its pistons.

Another object is to employ leakage liquid for holding the pistons against the thrust member.

A pump constructed according to the invention has the advantage that its pistons are so well guided that the danger of the transverse components of the pumping forces causing the outer ends of the cylinder bores to wear out of round is substantially eliminated.

Another advantage possessed by a pump constructed according to the invention is that the number of cylinders may be increased without correspondingly increasing the size of the cylinder barrel.

These and other objects and advantages will be apparent from the description hereinafter given of pumps in which the invention is embodied.

According to the invention in its general aspect, each piston has two portions of different diameters fitted in corresponding bores in the cylinder barrel, and the annular shoulder between the two portions constitutes the effective pumping area of the piston.

The invention is exemplified by the pumps shown somewhat diagrammatically in the accompanying drawings in which the views are as follows:

Fig. 6 is a vertical central longitudinal section through an axial type pump in which the invention is embodied.

Fig. 7 is a central longitudinal section taken thru the rear portion of the pump approximately at right angles to Fig. 6 as indicated by the line 7—7 of Fig. 10.

Fig. 8 is a fragmentary longitudinal section taken at right angles to the plane of Fig. 6 as indicated by the line 8—8 of Fig. 9.

Fig. 9 is a transverse vertical section taken on the line 9—9 of Fig. 6.

Figs. 1 to 5

Figure 1:
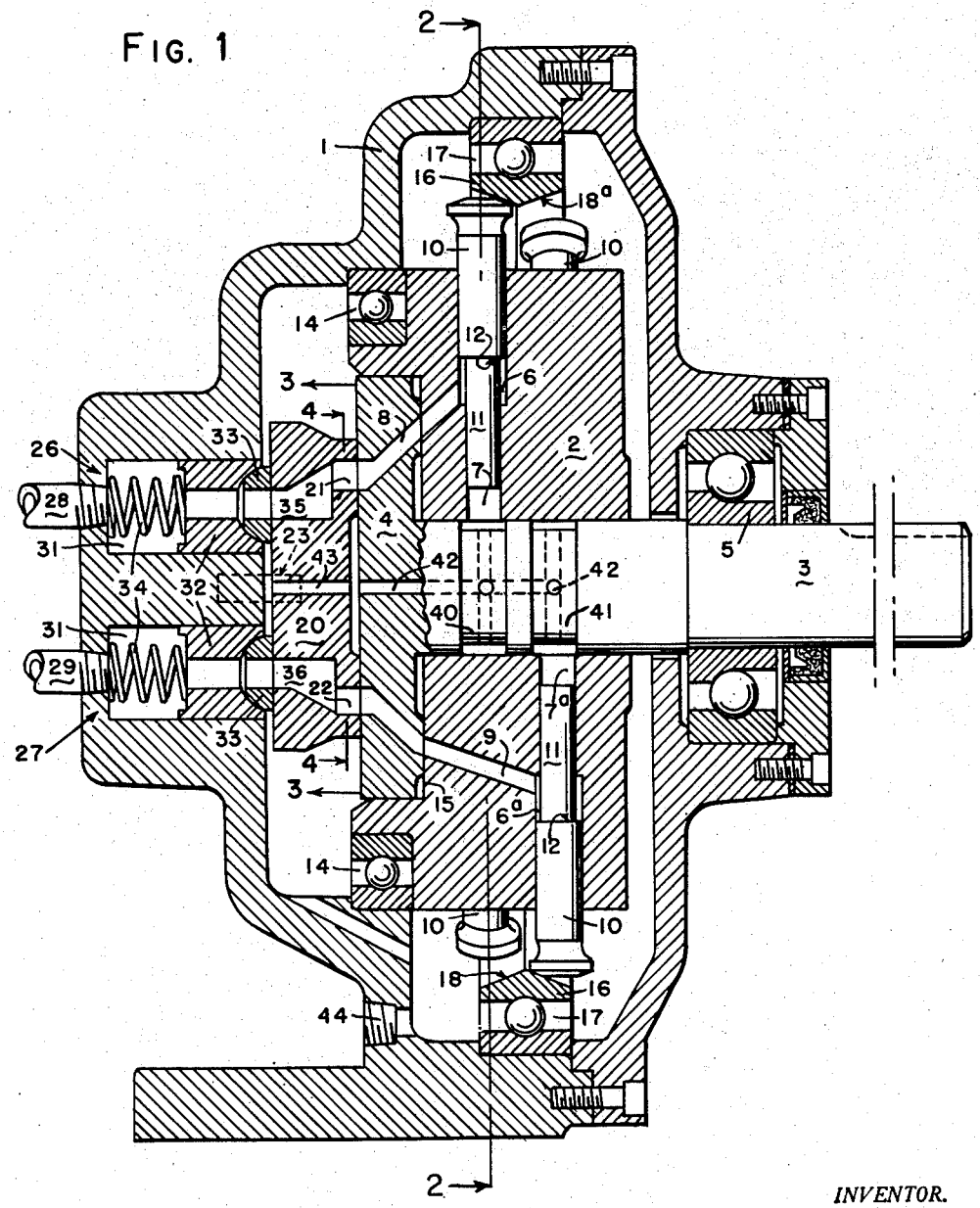
Figure 1 is a vertical longitudinal section through a radial type pump in which the invention is embodied, the section being taken substantially on the line 1—1 of Fig. 2.

The pump shown in these figures has its mechanism arranged within and carried by a casing 1 of suitable construction. Casing 1 encloses a rotatable cylinder barrel 2 which is fixed to a shaft 3 in any suitable manner such as by shaft 3 having a flange 4 fixed to or formed integral therewith and rigidly secured to cylinder 2 as by being bolted thereto. Shaft 3 extends outward through casing 1 for connection to a source of power and is journaled in a thrust bearing 5 carried by casing 1.

For the purpose of illustration, cylinder barrel 2 has been shown as having its pistons and cylinders arranged radially therein in two circular rows but it may have only one row or a larger number of rows of pistons and cylinders. Each cylinder in one row includes an outer portion or pumping cylinder 6, which extends radially inward a predetermined distance from the periphery of cylinder barrel 2, and a concentric non-pumping cylinder or bore 7 which is smaller in diameter than cylinder 6 and extends radially inward from the inner end thereof. When the pump is in operation, liquid flows to and from pumping cylinders 6 through a plurality of passages 8 each of which communicates with the inner end of a cylinder 6 and extends through cylinder barrel 2 and flange 4.

The cylinders in the second row are identical to the cylinders in the first row and they have been indicated by identical reference numerals with the exponent "a" added thereto. The second row of cylinders is rotated about one half of the cylinder spacing relative to the first row so that each cylinder $6^a$ is opposite the space between two adjacent cylinders 6. When the pump is in operation, liquid flows to and from cylinders $6^a$ through a plurality of passages 9 each of which is arranged between adjacent cylinders 6 and extends from the inner end of a cylinder $6^a$ outward through cylinder barrel 2 and flange 4.

The volumetric capacity of the pump may be increased by providing a cylinder barrel having more than two circular rows of pistons and cylinders with the cylinders of each row offset one half of the cylinder spacing from the cylinders in the adjacent row and communicating with a passage arranged between adjacent cylinders of the adjacent row. For example, if cylinder barrel 2 has three circular rows of cylinders, each cylinder 6 in the third row would be in the same radial plane as a cylinder 6 in the first row and it would be connected thereto by a passage arranged between adjacent cylinders $6^a$ of the second row. In pumps of considerably larger volumetric capacity, some of the cylinders communicate with passages which lead through one end of the cylinder barrel, the other cylinders communicate with passages which lead through the other end of the cylinder barrel, and the flow of liquid to and from the cylinders is controlled by two valves arranged at opposite ends of the cylinder barrel as will presently be explained.

Each of cylinders 6 and $6^a$ has a piston 10 closely fitted therein and provided with a concentric extension 11 which is closely fitted in bore 7 or $7^a$. Since passages 8 and 9 communicate with the inner ends of pumping cylinders 6 and $6^a$ respectively, the effective pumping area of each piston 10 is equal to the difference between its area and the area of extension 11. That is, the pumping area is the annular shoulder 12 formed upon piston 10 at its junction with extension 11.

Cylinder barrel 2 is rotatably supported at one side by bearing 5 and at its other side by a ball bearing 14 the outer race of which is fixed in casing 1. Bearing 14 is arranged radially outward from a recess 15 which is formed in cylinder barrel 2 and has flange 4 arranged therein so as to keep the overall length of the pump at a minimum.

During rotation of cylinder barrel 2, pistons 10 are reciprocated in their cylinders by an annular thrust member 16 which is eccentric to cylinder barrel 2. For the purpose of illustration, thrust member 16 has been shown as being rotatably supported within a ball bearing 17 which has its outer race fixed in a stationary position within casing 1 but the thrust member may be rotatably supported with a displacement varying member or slide block which is shiftable transversely of the cylinder barrel axis to vary the displacement of the pump according to common practice and as shown in the patents referred to above.

Thrust member 16 has two beveled reaction surfaces 18 and $18^a$ formed upon the inside thereof at acute angles with the respective piston axes and each surface engages the outer ends of the pistons in one of the circular rows. The outer end of each piston 10 is so shaped and of such a size that it engages a reaction surface upon a single spot which is offset far enough from the piston axis to cause the piston to rotate in its cylinder as it reciprocates therein as explained in Patent 2,074,068.

For the purpose of illustration, pistons 10 have been shown as having enlarged heads upon their outer ends in order that the contact spot may be located far enough from the piston axes to cause the pistons to rotate, reaction surfaces 18 and $18^a$ have been shown inclined in opposite directions relative to the cylinder barrel axis, and pistons 10 have been shown arranged upon radii of the cylinder barrel. However, pistons 10 may be made large enough in diameter to avoid the necessity of providing enlarged heads, reaction surfaces 18 and 18a may be inclined in the same direction, or reaction surfaces 18 and 18a may be parallel to the cylinder barrel axis and the pistons inclined to the radii of the cylinder barrel as shown in Patent No. 2,273,468, the term "radial" as used herein being intended to apply to a piston which extends through the outer periphery of a cylinder barrel inward toward the axis thereof regardless of whether the piston is upon or inclined to a radius of the cylinder barrel.

Figure 5:
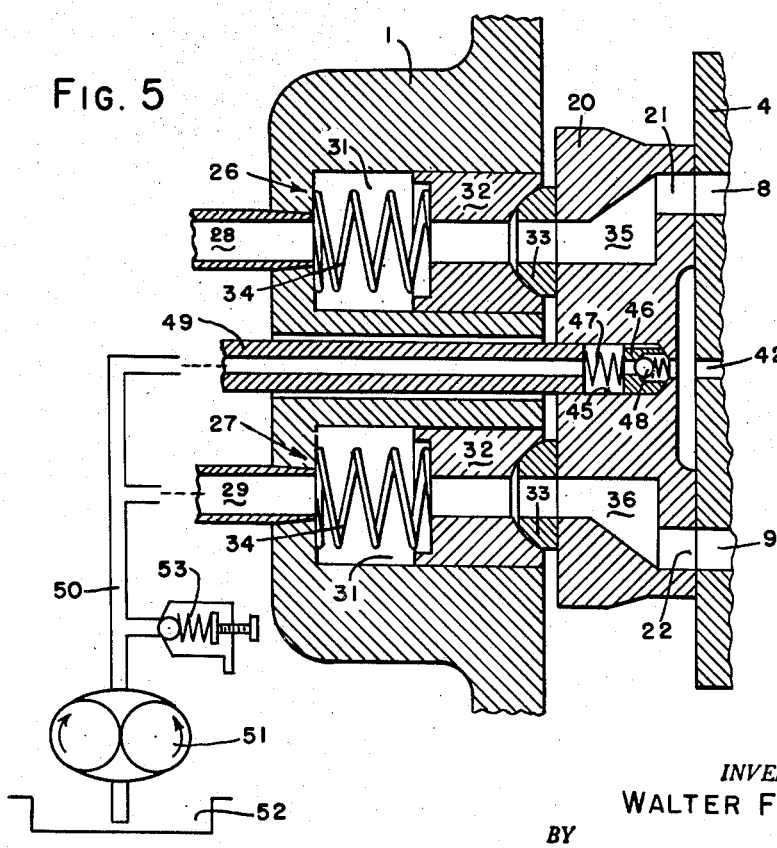
Fig. 5 is a sectional view similar to a portion of Fig. 1 but showing the pump provided with means for causing the pistons to be positively held against the thrust member.

Due to thrust member 16 being eccentric to cylinder barrel 2, each piston 10 will move progressively outward and liquid will flow into its cylinder during one half of each revolution of cylinder barrel 2, and it will be forced progressively inward and eject liquid from its cylinder during the other half of each revolution of cylinder barrel 2. A pump is ordinarily driven at such high speeds that the centrifugal force is sufficient to move the pistons outward and cause them to draw liquid into their cylinders but pistons may be moved outward by fluid pressure and the cylinders of the outward moving pistons may be filled with liquid supplied thereto at a low pressure by an auxiliary pump as indicated in Fig. 5.

The flow of liquid to and from the pumping cylinders is controlled by a flat valve 20 which engages the outer face of flange 4 and is provided in its face with two diametrically opposed arcuate ports 21 and 22 with which passages 8 and 9 register successively as cylinder barrel 2 rotates. The outer face of flange 4 constitutes a seat for valve 20 but, if shaft 3 were attached to cylinder barrel 2 in a different manner, valve 20 would engage a valve seat formed upon or attached to the end of cylinder barrel 2. Two pins 23, which are loosely fitted in valve 20 and are fixed in casing 1, permit valve 20 to move axially and to wabble slightly but prevent any substantial rotational or axial movement thereof.

Valve 20 has been shown as being urged against flange 4 by two hydraulic hold-up motors 26 and 27 which are arranged in casing 1 and adapted to be connected to opposite sides of an external circuit by channels 28 and 29 respectively, but the pump may be provided with a larger number of hold-up motors and with auxiliary hold-up and balancing motors as shown in Patent No. 2,484,337.

Hold-up motors 26 and 27 are identical and each has a cylinder 31 formed in casing 1 and adapted to be connected to one side of an external circuit by channel 28 or 29, a hollow piston 32 fitted in cylinder 31, an annular sealing member 33 arranged between piston 32 and valve 20 with its opening substantially in alignment with the opening through piston 32, and a spring 34 for initially urging piston 32 against member 33 and member 33 against valve 20.

The aligned openings through the piston 32 and sealing member 33 of hold-up motor 26 register with a passage 35 which extends through the rear end of valve 20 into communication with port 21, and the aligned openings through the piston 32 and member 33 of motor 27 register with a passage 36 which extends through the rear end of valve 20 into communication with port 22. The arrangement is such that liquid may flow freely between port 21 and channel 28 and between port 22 and channel 29. Any pressure prevailing in port 21 acts upon the piston 32 of motor 26 and any pressure prevailing in port 22 acts upon the piston 32 of motor 27 and causes valve 20 to be urged against its seat by a force which is proportional to pump pressure. Valve 20 is thus held against its seat by a hold-up force consisting of two factors one of which is supplied by springs 34 and is constant and the other of which is supplied by the motive liquid and varies in accordance with variations in pump pressure.

In the pump shown, the hold-up force tends to move cylinder barrel 2 axially toward the right but is prevented from doing so by thrust bearing 5. While this arrangement is satisfactory in small pumps, reaction surfaces 18 and 18a may be inclined in the same direction, as shown in Patent No. 2,273,468, so that the axial components of the pumping forces are opposite in direction to the hold-up forces and thereby relieve the axial load on bearing 5.

In a pump of considerably larger capacity, one half of the pumping cylinders communicate with the passages 8 and 9 which extend through the left end of the cylinder barrel and are controlled by a valve such as valve 20, and the other half of the pumping cylinders communicate with similar passages extending through the right end of the cylinder barrel and controlled by a valve which is arranged thereon and urged against its seat by at least four hold-up motors arranged far enough from the vertical center-line of the pump to permit the drive shaft to extend through the valve as shown in Patent No. 2,484,337. The hold-up forces are thus opposed and the cylinder barrel is hydrostatically balanced axially.

Figure 2:
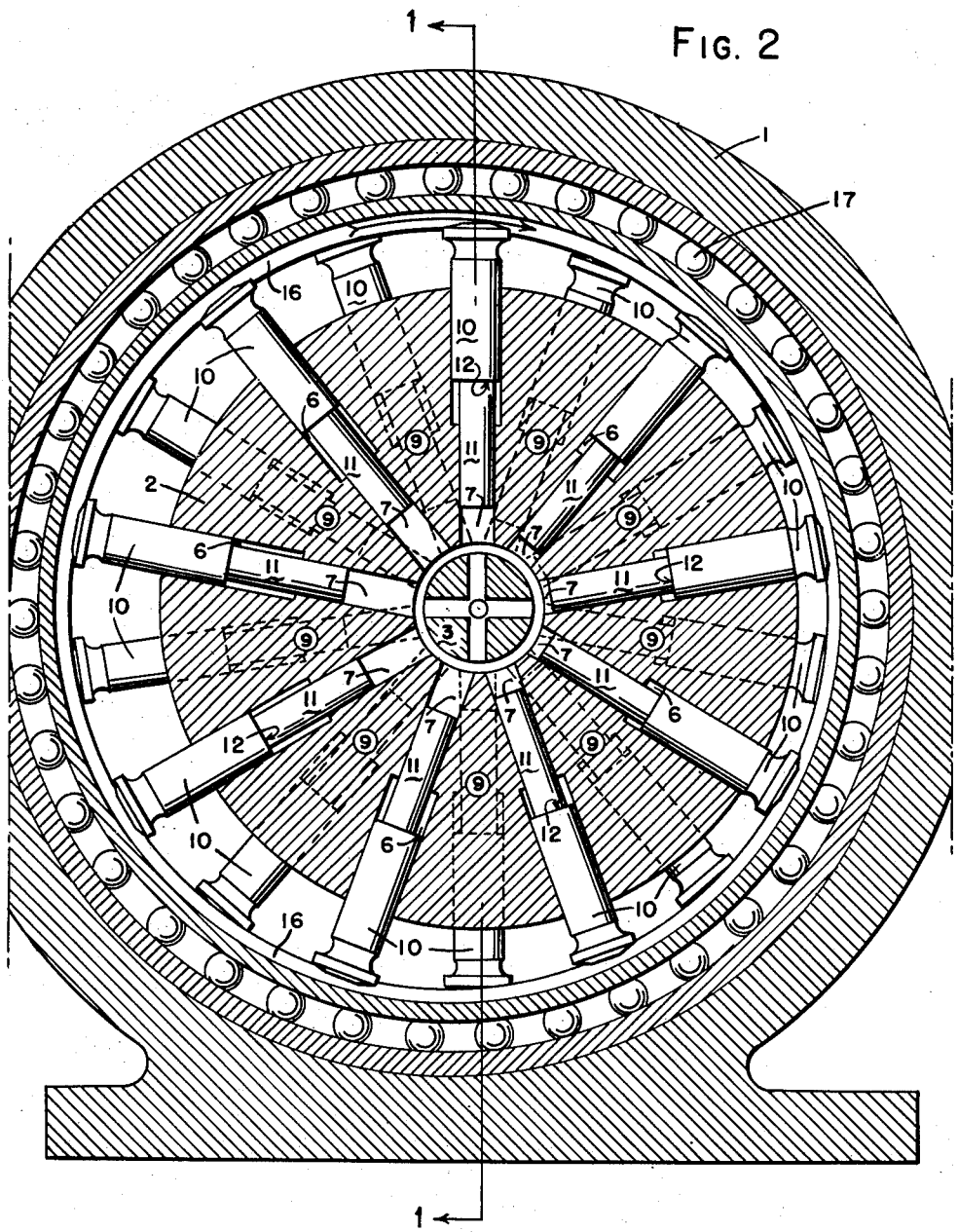
Fig. 2 is a transverse section taken on a line 2—2 of Fig. 1.
Figure 3:
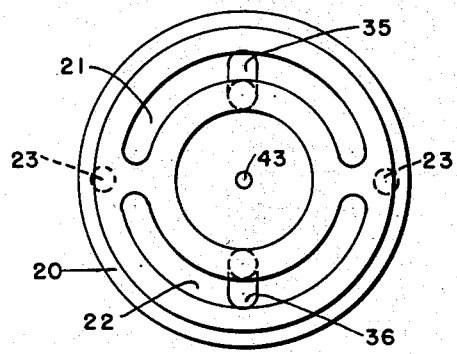
Fig. 3 is a face view of a valve which controls the flow of liquid to and from the cylinders of the pump shown in Figs. 1 and 2, the view being taken on the line 3—3 of Fig. 1.
Figure 4:
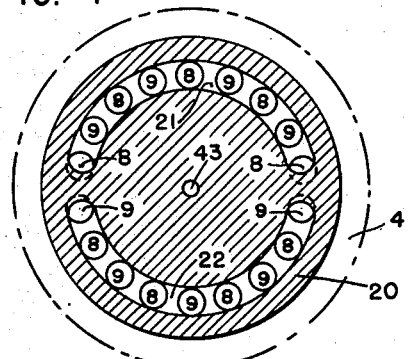
Fig. 4 is a section taken through the valve on the line 4—4 of Fig. 1 to show the relation between the ports in the valve and the passages which lead through the cylinder barrel to the cylinders.

When cylinder barrel 2 is rotated in a clockwise direction in respect to Fig. 2, the pistons 10 in contact with the lower half of thrust member 16 will move progressively outward and liquid will flow from channel 29 through hold-up motor 27, passage 36, valve port 22 and passages 8 and 9 into the cylinders of the outward moving pistons. At the same time, the pistons 10 in contact with the upper half of thrust member 16 will be forced progressively inward by thrust member 16 and will eject liquid from their cylinders through passages 8 and 9, valve port 21, passage 35, and hold-up motor 26 into channel 28.

Thrust member 16 engages the head of each piston 10 upon a single spot which is offset far enough from the piston axis to cause the piston to rotate in its cylinder as it reciprocates therein, and the force which can be transmitted from the thrust member to the liquid in the cylinder is limited by the bearing value of that spot. However, the force which must be transmitted through the pistons to create a given pressure is proportional to the effective pumping area of a piston multiplied by the pressure and, since the area of shoulder 12 is small, a very high pressure can be created without exerting upon each piston a load in excess of the bearing value of the contact spot.

Since each piston engages an inclined reaction surface 18 or 18a upon a spot which is offset from the piston axis, the pumping force is applied to the piston at a right angle to the inclined reaction surface. The pumping force is opposed by the resistance of the liquid against shoulder 12 which causes the pumping force to be resolved into a radial component which forces the piston inward and a lateral component which causes the piston to bear against one side of the cylinder. Due to extension 11, the bearing surface of the piston is much greater than on the conventional rolling piston, and the tendency of the cylinder to wear out of round is thus negligible.

Any liquid which may pass the extensions 11 on pistons 10 is collected in two annular grooves 40 and 41 which are formed in the peripheral surface of shaft 3 and register with the bores 7 and 7a respectively. Leakage liquid collected in grooves 40 and 41 may escape therefrom through a small passage 42 which extends axially through flange 4 into shaft 3 and has radial branches opening into grooves 40 and 41. If centrifugal force is sufficient to move the pistons outward and hold the heads thereof in contact with thrust member 16, a passage 43 may be extended thru valve 20 in alignment with passage 42 so that liquid leaking into passage 42 and any liquid leaking from port 21 or port 22 radially inward across the face of valve 20 may escape through passage 43 into casing 1 from whence all leakage liquid may escape through an outlet 44 to the reservoir (not shown) from which the pump is supplied with liquid.

When outward movements of the pistons of a radial pump are dependent solely upon centrifugal force, a piston sometimes will not move progressively outward as the cylinder barrel rotates but it will hesitate until its outer end is a substantial distance from the reaction surface and then it will move outward suddenly and strike the reaction surface with considerable force, thereby creating objectionable noise and tending to deform the end of the piston and/or the reaction surface. Such a condition frequently results when the working fluid is overheated and hence generates gas bubbles; or when air is entrained in the body of working fluid.

This objectionable feature may be avoided by subjecting shoulders 12 or the inner ends of extensions 11 or both to fluid pressure which will hold the outer ends of the pistons positively in contact with the thrust member. The inner ends of extension 11 may be subjected to pressure by providing a resistance valve to resist the discharge of leakage liquid from passage 42. Such a resistance valve may be arranged in passage 42. The pistons may be initially urged against the thrust member by supercharging the pump if it is small or if it is connected into a closed circuit but, if the pump is large and is connected into an open circuit, supercharging is not practical.

For the purpose of illustration, the pump has been shown in Fig. 5 as having a foot valve arranged in a bore 45 which extends through valve 20 into communication with passage 42 and has a suitable valve seat at its inner end. The foot valve includes a resistance valve 46, which is urged against the valve seat by a spring 47 and has an axial passage extending therethrough, and a check valve 48 which controls the passage through valve 46 and opens in a direction opposite to that in which valve 46 opens.

The arrangement is such that check valve 48 will permit liquid to flow substantially freely from bore 45 to passage 42 but will prevent liquid from flowing from passage 42 into bore 45 without raising valve 46 against the resistance of spring 47 which has sufficient strength to hold valve 46 to its seat until the pressure in passage 42 reaches a predetermined maximum, such as 100 lbs. per sq. in. The pressure in passage 42 also acts upon the front end of valve 20 and increases the blow-off force tending to move valve 20 away from its seat but this increase in blow-off force may be compensated for by correspondingly increasing the tension of springs 34.

In order that pistons 10 may be initially moved into contact with thrust member 16 independently of centrifugal force, the rear end of bore 45 may communicate with a tube 49 which is fixed to valve 20 and extends through the rear wall of casing 1 with sufficient clearance to permit valve 20 to bear uniformly upon its seat. Tube 49 may be connected by a channel 50 to the outlet of an auxiliary pump 51 which draws liquid from reservoir 52 and discharges the liquid delivered by it in excess of requirements through a low pressure relief valve 53.

Auxiliary pump 51 has been shown as being separate from the main pump but it may be arranged within casing 1 and driven in unison with cylinder barrel 2 according to common practice. Also, auxiliary pump 51 may be employed to supercharge the main pump by connecting channel 50 to channel 29, as indicated in Fig. 5, in case the main pump is unidirectional or by connecting channel 50 to both of channels 28 and 29 through check valves, as indicated in Fig. 6, in case the pump is reversible.

When the pump is started, liquid from auxiliary pump will flow through channel 50, tube 49 and bore 45, past check valve 48 and through channel 42 and grooves 40 and 41 into bores 7 and 7a where it will cause extensions 11 to move pistons 10 outward into contact with thrust member 16.

During rotation of cylinder barrel 2, the inward moving extensions 11 will eject liquid from the bores 7 and 7a on the discharge side of the pump and this liquid will flow through grooves 40 and 41 to the bores 7 and 7a on the intake side of the pump and move the extensions 11 in those bores outward. The total volume of liquid in grooves 41 and 42 including the portions of bores 7 and 7a not filled by extensions 11 is constant, as the increase of volume by outwardly moving pistons compensates for the decrease by inwardly moving pistons. The inner portions of bores 7 and 7a are thus flooded at all times and any liquid leaking past extensions 11 into bores 7 and 7a must escape therefrom through channel 42, resistance valve 46, bore 45, tube 49, channel 50 and relief valve 53 into reservoir 52. Consequently, each outward moving piston 10 is positively held against thrust member 16 by a force proportional to the combined resistances of valves 46 and 53.

*Figs. 6–11*

The axial pump shown in these figures has its mechanism arranged within and supported by a casing 62 which is closed at its front end by a removable front plate 63 and at its rear by an integral wall having a boss 64 formed thereon.

Casing 62 encloses a rotatable cylinder barrel 65 which is arranged upon a drive shaft 66 and fixed for rotation therewith. Shaft 66 extends through front plate 63 for connection to a source of power and it is journaled in bearings 67 and 68 carried, respectively, by a front plate 63 and boss 64.

Cylinder barrel 65 has a plurality of pumping cylinders 69 extending inward from the front end thereof parallel to the cylinder barrel axis and a coaxial non-pumping cylinder or bore 70 of smaller diameter extending rearward from the inner end of each cylinder 69. A pumping piston 71 is fitted in each cylinder 69 and has a smaller coaxial extension 72 fixed thereto and fitted in the bore 70 which is coaxial with that cylinder.

Each piston 71 is provided upon its outer end with an arcuate contact surface to engage a reaction surface which is formed upon a thrust member and inclined to the cylinder barrel axis. As shown, each piston 71 is provided upon its outer end with an enlarged head 73 having upon its outer face an inclined contact surface to engage an internal conical reaction surface 74 which is formed upon a thrust member 75 and has its axis parallel to the cylinder barrel axis. Reaction surface 74 engages each piston upon a single spot which remains upon the outside of the piston axis in respect to the cylinder barrel axis throughout a complete revolution of the cylinder barrel.

However, thrust member 75 may be provided with an external conical reaction surface which engages each piston head at a point inside the piston axis. This construction has not been illustrated as it is simply the reverse of the construction shown. Also, under certain conditions, each piston may be provided with a head which is no larger than the piston body, that is, the contact surface may be formed on the end of the piston body, but in practice it is ordinarily found to be advantageous to provide each piston with an enlarged head. The contact surface upon the outer end or head of each piston is arcuate but preferably not spherical and is ordinarily formed by shaping the outer end or head into the form of a truncated cone and then generating the contact surface by holding it in contact with a grinding surface corresponding to reaction surface 74, revolving the piston about an axis corresponding to the axis of cylinder barrel 65 and causing or permitting the grinding surface to rotate upon an axis which is parallel to but offset from the axis about which the piston revolves. The generated surface thus produced provides the largest possible bearing spot in any position of the piston.

Thrust member 75 is restrained from axial movement but, if it were restrained from rotation also, the rotative speed of the cylinder barrel would be limited by the rotative speed which could be imparted to the pistons, thereby limiting the volumetric delivery of the pump. For this reason, thrust member 75 is rotatably supported as by means of a thrust bearing 76 the axis of which coincides with the axis of conical reaction surface 74.

Bearing 76 is carried by a reaction member or support 77 which is restrained from axial or rotative movement but which in a variable displacement pump is adjustable transversely of the cylinder barrel axis to change the stroke of the pistons.

As best shown in Fig. 8, support 77 is restrained from movement away from cylinder barrel 65 by two abutments 78 which are carried by front plate 63 upon opposite sides of shaft 66 and engage bearing surfaces 78ª formed upon the front face of support 77 near each of its lateral sides.

As best shown in Figs. 8 and 9, support 77 is restrained from lateral movement by two guides 79 which are fixed upon the front face thereof with the inner edge of each guide in contact with the outer edge of an abutment 78.

Abutments 78 and guides 79 prevent support 77 from moving in two directions but permit it to be moved vertically either by hydraulic or mechanical means both of which are in common use. As shown in Fig. 6, a screw 80 is threaded through the top of casing 62 and attached to support 77 by a connection which permits it to rotate independently thereof.

Screw 80 is provided upon its upper end with a hand wheel 81 by means of which it may be rotated to raise or lower support 77 and thrust member 75 to thereby vary the stroke of the pump.

When the axis of reaction surface 74 coincides with the cylinder barrel axis, the point of contact between each piston head and the reaction surface remains at the same axial distance from the cylinder barrel throughout a complete revolution of the cylinder barrel. Consequently, the pistons are not reciprocated and no liquid will be delivered by the pump. When the axis of reaction surface 74 is offset from the cylinder barrel axis, the point of contact between each piston head and the reaction surface moves toward the cylinder barrel during one half-revolution of the cylinder barrel and recedes from the cylinder barrel during the other half-revolution, thereby forcing each piston rearward into its cylinder to expel liquid therefrom during one half-revolution and permitting each piston to move forward and liquid to enter its cylinder during the other half-revolution.

Liquid flows to and from each cylinder 69 through a channel 85 which extends from the inner end thereof through the rear end of cylinder barrel 65. The outer or rear ends of channels 85 are arranged in a circle and constitute cylinder ports which are controlled by a flat valve 86 arranged upon boss 64 and having formed therein two arcuate ports 87 and 88 with which each channel 85 communicates alternately as cylinder barrel 65 rotates.

Valve 86 may be formed integral with boss 64 but it has been shown arranged in a recess formed therein and prevented from rotating by two pins or screws 89 the heads of which do not extend beyond the face of valve 86.

Ports 87 and 88 communicate, respectively, with two channels 90 and 91 which extend rearward therefrom through valve 86 and boss 64 for connection to an external circuit as by means of two pipes 92 and 93 fastened to boss 64 in communication with channels 90 and 91 respectively.

In order to provide for the escape of any liquid which may leak past extensions 72 into bores 70, a channel 94 is extended from the inner end of each bore 70 into communication with an annular groove 95 which is formed in the face of valve 86 and communicates with a channel 96 leading therefrom outward through valve 86 and boss 64.

Channel 96 may be connected to drain but, in order that piston heads 73 may be initially moved into and positively held in contact with reaction surface 74, channel 96 has been shown connected to the discharge channel 97 of an auxiliary pump 98 through a channel 99 and a foot valve consisting of a resistance valve 100 and a check valve 101 which open in opposite directions.

Auxiliary pump 98 may be arranged within casing 62 and driven in unison with cylinder barrel 65 according to common practice but for the sake of simplicity it has been shown as a separate pump and as drawing liquid from a reservoir 102 and discharging it into channel 97. Liquid discharged by auxiliary pump 98 in excess of requirements is exhausted into reservoir 102 through a low pressure relief valve 103 which enables gear pump 98 to maintain a constant low pressure in channel 97. Channel 97 may also be connected to channels 90 and 91 through check valves 104 and 105, respectively, so that the high pressure pump may be supercharged by auxiliary pump 98 according to a common practice.

Heads 73 on pistons 71 are initially moved into contact with reaction surface 74 by liquid delivered by auxiliary pump 98 through channel 97, check valve 101, channels 99 and 96, groove 95 and channels 94 to the inner ends of bores 70 where it acts upon the ends of extensions 72. Each piston head 73 is thus urged against reaction surface 74 by a force which, if friction is disregarded, is proportional to the pressure of the liquid.

In order that pump 98 may create pressure in bores 70, it is essential that cylinder barrel 65 be firmly held against valve 86 when the pump is idle. As shown, cylinder barrel 65 is urged against valve 86 by a compression spring 106 arranged between the front end of cylinder barrel 65 and a collar 107 which is fixed upon shaft 66. When the pump is in operation, cylinder barrel 65 is urged against valve 86 by spring 106 and by fluid pressures acting upon the inner ends of cylinders 69 and bores 70.

Figure 10:
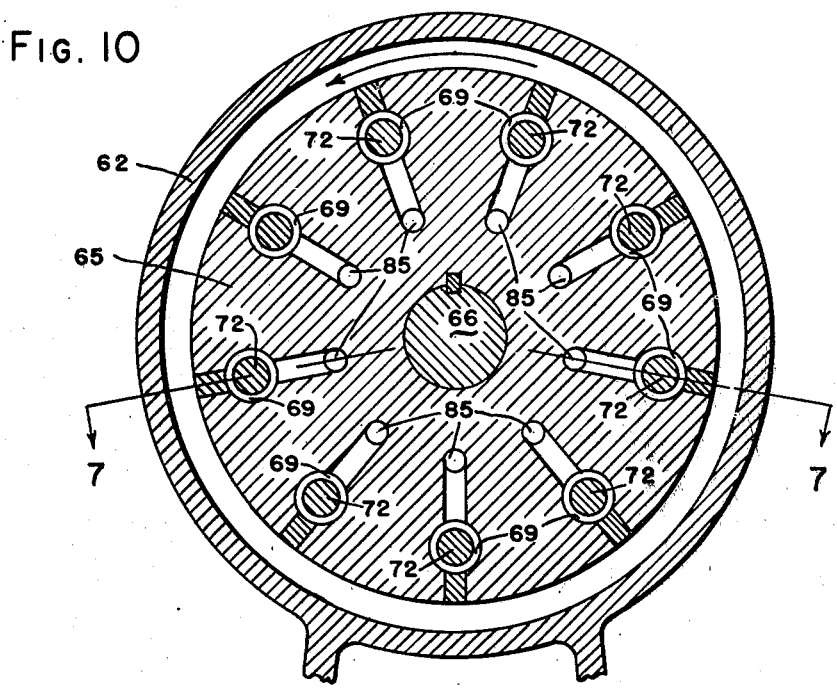
Fig. 10 is a transverse vertical section taken on the line 10—10 of Fig. 6.
Figure 11:
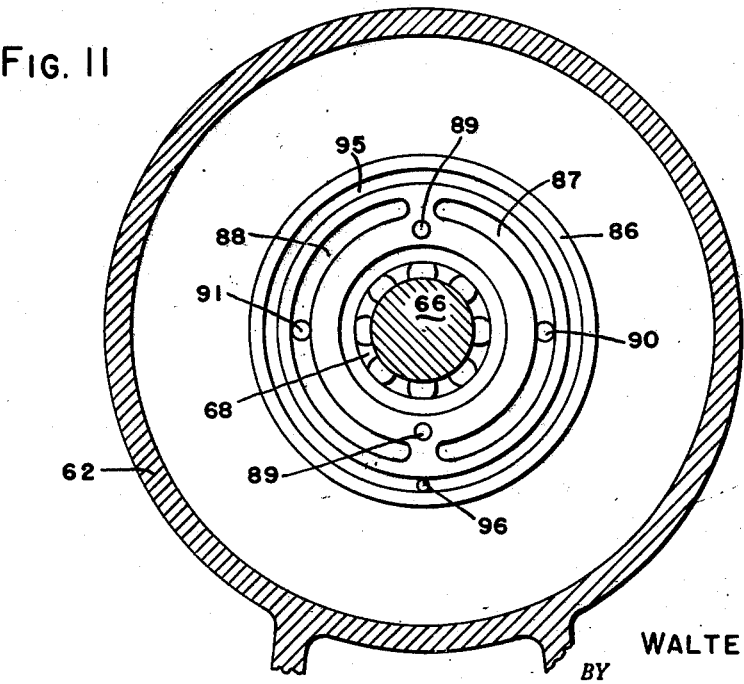
Fig. 11 is a transverse vertical section taken on the line 11—11 of Fig. 6.

When cylinder barrel 65 is rotated in a counterclockwise direction in respect to Fig. 10 and the axis of thrust member 75 is above the cylinder barrel axis, the pistons 71 at the right of the vertical centerline will move progressively outward and their cylinders 69 will be filled with liquid which flows thereto through channels 85 and valve port 87 from channel 90. At the same time, the pistons 71 at the left of the vertical centerline will be forced progressively inward by thrust member 75 and will eject liquid from their cylinders 69 through channels 85 and valve port 88 into channel 91. If thrust member 75 is moved downward until its axis is below the cylinder barrel axis, the flow of liquid will be reversed.

The rearward moving extensions 72 will eject liquid from the bores 70 on the discharge side of the pump and this liquid will flow through channels 94 and groove 95 to the bores 70 on the intake side of the pump and move the extensions 72 in those bores forward. The inner portions of bore 70 are thus flooded at all times and any liquid leaking past extensions 72 must escape through channels 94, groove 95, channels 96 and 99, resistance valve 100, channel 97 and relief valve 103 into reservoir 102. Consequently, the head 73 of each outward moving piston 71 is positively held against reaction surface 74 by a force proportional to the combined resistances of valves 100 and 103.

Reaction surface 74 on thrust member 75 engages the head 73 of each piston 71 upon a single spot which is offset far enough from the piston axis to cause the piston to rotate in its cylinder as it reciprocates therein, and the force which can be transmitted from the thrust member to the liquid in the cylinder is limited by the bearing value of that spot. However, the force which must be transmitted through a piston to create a given pressure is proportional to the effective pumping area of the piston multiplied by the pressure and, since the pumping area of each piston 71 is very small due to the displacement of its extension 72, a very high pressure can be created without exerting upon each piston head a load in excess of the bearing value of the contact spot.

Since each piston head 73 engages inclined reaction surface 74 upon a single spot which is offset from the piston axis, the pumping force is applied to each piston at a right angle to the reaction surface. The position of the contact spot is such that the line of force passes through valve 86 at or near the high pressure valve port so that the pumping force may not tend to tilt the cylinder barrel relative to the valve.

As previously explained, the pumping force applied to each piston is opposed by the pressures in its cylinder 69 and bore 70 which causes the pumping force to be resolved into an axial component which forces the piston inward and a lateral component which causes the piston to bear against one side of its cylinder. Due to extension 72, the bearing surface of the piston is much greater than on the conventional rolling piston, and the tendency of the cylinder to wear out of round is thus negligible.

The invention herein set forth is susceptible of various modifications and adaptations without departing from the scope of the invention which is hereby claimed as follows.

I claim:

1. In a hydrodynamic machine, the combination of a rotatable cylinder barrel having a plurality of pumping cylinders arranged therein in a circular row and a smaller coaxial bore extending inward from the inner end of each cylinder, a piston fitted in each cylinder and having a coaxial extension of smaller diameter fixed to its inner end and fitted in the bore extending inward from that cylinder, an annular reaction surface engaging the outer ends of the pistons in said row and arranged eccentric to said cylinder barrel to cause said pistons to reciprocate during rotation of said cylinder barrel, a channel communicating with the inner end of each pumping cylinder, and valve means for controlling said channels to thereby control the flow of liquid to and from said cylinders, a source of pressure liquid other than said cylinders, and means for supplying liquid from said source to said bores to urge said extensions and said pistons outward.

2. In a hydrodynamic machine, the combination of a rotatable cylinder barrel having a plurality of pumping cylinders arranged therein in a circular row and a smaller coaxial bore extending inward from the inner end of each cylinder, a piston fitted in each cylinder and having a coaxial extension of smaller diameter fixed to its inner end and fitted in the bore extending inward from that cylinder, an annular reaction surface engaging the outer ends of the pistons in said row and arranged eccentric to said cylinder barrel to cause said pistons to reciprocate during rotation of said cylinder barrel, said reaction surface being inclined to the piston axes and engaging each piston upon a single spot which is offset far enough from the piston axis to cause the piston to rotate in its cylinder as it reciprocates therein, a channel communicating with the inner end of each pumping cylinder, valve means for controlling said channels to thereby control the flow of liquid to and from said cylinders, a source of pressure liquid other than said cylinders, and means for supplying liquid from said source to said bores to urge said extensions and said pistons outward.

3. In a hydrodynamic machine, the combination of a rotatable cylinder barrel having a plurality of pumping cylinders arranged therein in a circular row and a smaller coaxial bore extending inward from the inner end of each cylinder, a piston fitted in each cylinder and having a coaxial extension of smaller diameter fixed to its inner end and fitted in the bore extending inward from that cylinder, an annular reaction surface engaging the outer ends of the pistons in said row and arranged eccentric to said cylinder barrel to cause said pistons to reciprocate during rotation of said cylinder barrel, a channel communicating with the inner end of each pumping cylinder, valve means for controlling said channels to thereby control the flow of liquid to and from said cylinders, channel means connecting said bores to each other, and means for permitting liquid leaking past said extensions into said bores to escape from said channel means including a resistance valve to resist escape of said leakage liquid and thereby maintain in said bores fluid pressure which acts upon said extensions and holds said pistons in contact with said reaction surface.

4. In a hydrodynamic machine, the combination of a rotatable cylinder barrel having a plurality of pumping cylinders arranged therein in a circular row and a smaller coaxial bore extending inward from the inner end of each cylinder, a piston fitted in each cylinder and having a coaxial extension of smaller diameter fixed to its inner end and fitted in the bore extending inward from that cylinder, an annular reaction surface engaging the outer ends of the pistons in said row and arranged eccentric to said cylinder barrel to cause said piston to reciprocate during rotation of said cylinder barrel, a channel communicating with the inner end of each pumping cylinder, valve means for controlling said channels to thereby control the flow of liquid to and from said cylinders, channel means for connecting said bores to each other to enable liquid expelled from the bores on one side of the machine by inward moving pistons to flow to the bores on the other side of the machine and move the extensions therein outward, and means for permitting liquid leaking past said extensions to escape from said channel means including a resistance valve to resist said escape of liquid and thereby create a pressure which acts upon said extensions and urges said pistons against said reaction surface.

5. In a hydrodynamic machine, the combination of a rotatable cylinder barrel having a plurality of pumping cylinders arranged therein in a circular row and a smaller coaxial bore extending inward from the inner end of each cylinder, a piston fitted in each cylinder and having a coaxial extension of smaller diameter fixed to its inner end and fitted in the bore extending inward from that cylinder, an annular reaction surface engaging the outer ends of the pistons in said row and arranged eccentric to said cylinder barrel to cause said pistons to reciprocate during rotation of said cylinder barrel, said reaction surface being inclined to the piston axes and engaging each piston upon a single spot which is offset far enough from the piston axis to cause the piston to rotate in its cylinder as it reciprocates therein, a channel communicating with the inner end of each pumping cylinder, valve means for controlling said channels to thereby control the flow of liquid to and from said cylinders, means for connecting said bores to each other to enable liquid expelled from the bores on one side of the machine by inward moving pistons to flow to the bores on the other side of the machine and move the extensions therein outward, and a resistance valve for resisting the discharge from said bores of liquid leaking past said extensions to thereby create a pressure which acts upon said extensions and urges said pistons against said reaction surface.

6. In a hydrodynamic machine, the combination of a rotatable cylinder barrel having a valve seat upon an end thereof, a plurality of radial pumping cylinders arranged in said cylinder barrel in at least two circular rows with the cylinders in one row arranged opposite the space between adjacent cylinders in the other row, channels extending from said valve seat into communication with the cylinders in the adjacent row, other channels arranged between adjacent cylinders of said adjacent row and extending from said valve seat into communication with the cylinders in the other row, a piston fitted in each cylinder, means for reciprocating said pistons during rotation of said cylinder barrel, and valve means engaging said seat for controlling said channels to thereby control the flow of liquid to and from said cylinders.

7. In a hydrodynamic machine, the combination of a rotatable cylinder barrel having a valve seat upon an end thereof, a plurality of radial pumping cylinders arranged in said cylinder barrel in at least two circular rows with the cylinders in one row arranged opposite the space between adjacent cylinders in the other row, channels extending from said valve seat into communication with the cylinders in the adjacent row, other channels arranged between adjacent cylinders of said adjacent row and extending from said valve seat into communication with the cylinders in the other row, a coaxial bore of less diameter than said cylinders extending inward from the inner end of each cylinder, a piston fitted in each cylinder and having a coaxial extension of smaller diameter fixed to its inner end and fitted in the bore extending inward from that cylinder, means for reciprocating said pistons during rotation of said cylinder barrel, and valve means for controlling said channels to thereby control the flow of liquid to and from said cylinders.

8. In a hydrodynamic machine, the combination of a rotatable cylinder barrel having a valve seat upon an end thereof, a plurality of radial pumping cylinders arranged in said cylinder barrel in at least two circular rows with the cylinders in one row arranged opposite the space between adjacent cylinders in the other row, channels extending from said valve seat into communication with the cylinders in the adjacent row, other channels arranged between adjacent cylinders of said adjacent row and extending from said valve seat into communication with the cylinders in the other row, a coaxial bore of less diameter than said cylinders extending inward from the inner end of each cylinder, a piston fitted in each cylinder and having a coaxial extension of smaller diameter fixed to its inner end and fitted in the bore extending inward from that cylinder, a thrust member arranged around said cylinder barrel eccentric thereto to effect reciprocation of said pistons during rotation of said cylinder barrel and engaging each piston upon a single spot which is offset far enough from the piston axis to cause the piston to rotate in its cylinder as it reciprocates therein, and valve means for controlling said channels to thereby control the flow of liquid to and from said cylinders.

9. In a hydrodynamic machine, the combination of a rotatable cylinder barrel having a valve seat upon an end thereof, a plurality of radial pumping cylinders arranged in said cylinder barrel in at least two circular rows with the cylinders in one row arranged opposite the space between adjacent cylinders in the other row, channels extending from said valve seat into communication with the cylinders in the adjacent row, other channels arranged between adjacent cylinders of said adjacent row and extending from said valve seat into communication with the cylinders in the other row, a coaxial bore of less diameter than said cylinders extending inward from the inner end of each cylinder, a piston fitted in each cylinder and having a coaxial extension fitted in the bore extending inward from that cylinder, said extension forming with said piston a shoulder which constitutes the pumping area of said piston, means for reciprocating said pistons during rotation of said cylinder barrel, and valve means for controlling said channels to thereby control the flow of liquid to and from said cylinders.

10. In a hydrodynamic machine, the combination of a rotatable cylinder barrel having pumping cylinders arranged radially therein and a smaller coaxial bore extending inward from the inner end of each cylinder, a piston fitted in each cylinder and having a coaxial extension of smaller diameter fixed to its inner end and fitted in the bore extending inward from that cylinder, an annular thrust member extending around said cylinder barrel eccentric thereto and engaging the outer ends of said pistons to cause said pistons to reciprocate during rotation of said cylinder barrel, a channel communicating with the inner end of each pumping cylinder, valve means arranged upon an end of said cylinder barrel for controlling said channels to thereby control the flow of liquid to and from said cylinders, a source of pressure liquid other than said cylinders, and means for supplying liquid from said source to said bores to act upon said extensions and hold said pistons in contact with said reaction surface.

11. In a hydrodynamic machine, the combination of a rotatable cylinder barrel having pumping cylinders arranged radially therein and a smaller coaxial bore extending inward from the inner end of each cylinder, a piston fitted in each cylinder and having a coaxial extension of smaller diameter fixed to its inner end and fitted in the bore extending inward from that cylinder, a thrust member arranged around said cylinder barrel eccentric thereto to effect reciprocation of said pistons during rotation of said cylinder barrel and engaging each piston upon a single spot which is offset far enough from the piston axis to cause the piston to rotate in its cylinder as it reciprocates therein, a channel communicating with the inner end of each pumping cylinder, valve means for controlling said channels to thereby control the flow of liquid to and from said cylinders, and means for permitting liquid leaking past said extensions to escape from said bores including a resistance valve to resist said escape of liquid and thereby maintain in said bores pressure which acts upon said extensions and holds said pistons in contact with said reaction surface.

12. In a hydrodynamic machine, the combination of a rotatable cylinder barrel having pumping cylinders arranged radially therein and a smaller coaxial bore extending inward from the inner end of each cylinder, a piston fitted in each cylinder and having a coaxial extension of smaller diameter fixed to its inner end and fitted in the bore extending inward from that cylinder, a thrust member arranged around said cylinder barrel eccentric thereto to effect reciprocation of said pistons during rotation of said cylinder barrel and engaging each piston upon a single spot which is offset far enough from the piston axis to cause the piston to rotate in its cylinder as it reciprocates therein, a channel communicating with the inner end of each pumping cylinder, valve means for controlling said channels to thereby control the flow of liquid to and from said cylinder, means for connecting said bores to each other to enable liquid expelled from the bores on one side of the machine by inward moving pistons to flow to the bores on the other side of the machine and move the extensions therein outward, and a resistance valve for resisting the discharge from said bores of liquid leaking past said extensions to thereby create a pressure which acts upon said extensions and urges said pistons against said reaction surface.

13. In a hydrodynamic machine, the combination of a rotatable cylinder barrel having a plurality of pumping cylinders arranged axially therein in a circular row and a smaller coaxial bore extending inward from the inner end of each cylinder, a piston fitted in each cylinder and having a coaxial extension of smaller diameter fixed to its inner end and fitted in the bore extending inward from that cylinder, a thrust member engaging said pistons to effect reciprocation thereof during rotation of said cylinder barrel, a channel communicating with the inner end of each pumping cylinder, valve means for controlling said channels to thereby control the flow of liquid to and from said cylinders, and means for permitting liquid leaking past said extensions to escape from said bores including a resistance valve to resist said escape of liquid and thereby maintain in all of said bores pressure which acts upon said extensions and holds said pistons in contact with said reaction surface.

14. In a hydrodynamic machine, the combination of a rotatable cylinder barrel having a plurality of pumping cylinders arranged axially therein in a circular row and a smaller coaxial bore extending inward from the inner end of each cylinder, a piston fitted in each cylinder and having a coaxial extension of smaller diameter fixed to its inner end and fitted in the bore extending inward from that cylinder, a thrust member engaging said pistons to effect reciprocation thereof during rotation of said cylinder barrel, a channel communicating with the inner end of each pumping cylinder, valve means for controlling said channels to thereby control the flow of liquid to and from said cylinders, means for connecting said bores to each other to enable liquid expelled from the bores on one side of the machine by inward moving pistons to flow to the bores on the other side of the machine and move the extensions therein outward, and a resistance valve for resisting the discharge from said bores of liquid leaking past said extensions to thereby create a pressure which acts upon said extensions and urges said pistons against said reaction surface.

15. In a hydrodynamic machine, the combination of a rotatable cylinder barrel having a plurality of pumping cylinders arranged therein in a circular row and a smaller coaxial bore extending inward from the inner end of each cylinder, a piston fitted in each cylinder and having a coaxial extension of smaller diameter fixed to its inner end and fitted in the bore extending inward from that cylinder, a reaction surface engaging the outer ends of the pistons in said row to cause said pistons to reciprocate during rotation of said cylinder barrel, a channel communicating with the inner end of each pumping cylinder, valve means for controlling said channels to thereby control the flow of liquid to and from said cylinders, means for supplying to the inner ends of said bores liquid to act upon said extensions and initially move said pistons into contact with said reaction surface, and means permitting escape from said bores of liquid leaking past said extensions including a resistance valve to resist said escape of liquid to thereby create a pressure which acts upon said extensions and holds said pistons against said reaction surface.

WALTER FERRIS.

REFERENCES CITED

The following references are of record in the file of this patent:

UNITED STATES PATENTS

| Number | Name | Date |
|---|---|---|
| 1,634,867 | Borletti | July 5, 1927 |
| 1,925,378 | Ferris et al. | Sept. 5, 1933 |
| 1,998,984 | Ferris | Apr. 23, 1935 |
| 2,069,651 | Ferris | Feb. 2, 1937 |
| 2,074,068 | Ferris | Mar. 16, 1937 |
| 2,229,715 | Zimmerman | Jan. 28, 1941 |
| 2,231,361 | Ferris | Feb. 11, 1941 |
| 2,254,103 | Douglas | Aug. 26, 1941 |
| 2,273,468 | Ferris | Feb. 17, 1942 |
| 2,284,109 | Vickers | May 26, 1942 |
| 2,304,903 | Eppens | Dec. 15, 1942 |
| 2,345,446 | Baker | Mar. 28, 1944 |
| 2,406,138 | Ferris et al. | Aug. 20, 1946 |
| 2,420,080 | Huck | May 6, 1947 |
| 2,470,220 | Mott | May 17, 1949 |
| 2,484,337 | Ferris | Oct. 11, 1949 |

FOREIGN PATENTS

| Number | Country | Date |
|---|---|---|
| 113,163 | Great Britain | 1918 |